United States Patent Office 2,981,764
Patented Apr. 25, 1961

2,981,764

PRODUCTION OF VINYL CHLORIDE

Henri Le Bihan, Liege, and Jean André Robert Ovide Léon Godart, Tilff, Belgium, assignors to Societe Belge de l'Azote et des Produits Chimiques du Marly, Renory-Ougree, Belgium No Drawing. Filed Dec. 11, 1957, Ser. No. 701,964

Claims priority, application Great Britain Dec. 18, 1956

2 Claims. (Cl. 260—656)

This invention relates to the production of vinyl chloride and is concerned with an improved process for the preparation of vinyl chloride from dichlorethane.

It is known that vinyl chloride may be obtained by thermal decomposition of dichlorethane in the vapor phase and various processes using as catalysts metallic salts, e.g. on a support such as active carbon, have been proposed. However, these metallic salts are rapidly deactivated due to the deposit of pyrolysis by-products such as carbon and tars. This deactivation makes it necessary to interrupt production for the regeneration or replacement of the catalysts, particularly since the reaction tubes become choked by the deposits.

When using active carbon alone as a catalyst for the pyrolysis of dichlorethane, it is not possible to remedy these drawbacks, and the production rate of vinyl chloride, calculated on the quantity of active carbon, is relatively low. For this reason, in some industrial processes it is preferred to effect the thermal decomposition of dichlorethane into vinyl chloride in reaction tubes which are free from filling materials under a pressure of a few atmospheres above atmospheric pressure. However, these processes are still disadvantageous due to the high pyrolysis temperatures and the weak heat transmission which contribute to the formation of carbon and other pyrolysis by-products, while making it necessary to use pyrolysis tubes of reduced diameter.

According to this invention, it has been found that these drawbacks may be remedied by effecting the pyrolysis of dichlorethane in the presence of ash-free carbon which is prepared by washing active carbon firstly with 2 N nitric acid at a temperature of substantially 50 to 75° C., and then with water, said ash-free carbon being free from metallic salts such as iron salts which catalyze the formation of parasitic products.

It has been observed that, in the presence of such ash-free active carbon, the pyrolysis of dichlorethane may be effected at relatively low temperatures, i.e. between 350 and 400° C. instead of 550 to 650° C. as in several known processes. Owing to these low temperatures, the formation of tars and other secondary reactions are reduced to a minimum, thus giving yields of vinyl chloride which are higher than those obtained according to the known processes.

The following example illustrates a particularly advantageous method for producing vinyl chloride from dichlorethane. Through a tube of stainless steel of 1 m. in length and 18 mm. in internal diameter, and containing ash-free active carbon heated to a temperature of 400° C., 2 kg. of 1,2-dichlorethane vapors are passed in one hour, under a gauge pressure of 8 atmospheres. The reaction products are fractionally condensed and distilled to recover pure vinyl chloride and untransformed dichlorethane, respectively. The latter is recycled to the pyrolysis zone. The method of fractionally condensing and distilling the reaction products is conventional and similar to the method of purification of vinyl chloride (obtained from acetylene and hydrochloric acid) described in "German Plastics Practice" (published by De Bell and Richardson, Edit. 1946, pp. 45–49).

Under these conditions, a yield of 99% of vinyl chloride is obtained with a conversion rate of 65 to 70% per pass.

Comparative tests effected under the same conditions with other catalysts have given varying results, the best of which correspond to a yield in vinyl chloride which does not exceed 95% with a conversion rate of up to 45% per pass. Until the catalytic tube was choked (due to the deposits of carbon and tars on the catalyst), the period of active production was at most equal to half the production time in the presence of ash-free carbon.

In the presence of non-deashed active carbon, the production of vinyl chloride varies according to the quality of the carbon which is used. However, while in the known cases the yield does not exceed 110 to 130 g. for each litre of catalyst per hour, it reaches 760 g. for the process effected in the presence of ash-free carbon.

Furthermore, in the absence of catalyst and under the same pressure of 8 kg./cm.$^2$, the pyrolysis tube must be heated to a temperature of 550° C. to obtain an equal production for each litre of reaction space, the rate of parasitic reactions being then higher.

It will be understood that this invention is not limited to the above method, but may be applied to other dehydrochlorination reactions, e.g. the pyrolysis of 1,1-dichlorethane into vinyl chloride.

Although in the case of 1,2-dichlorethane the pyrolysis reaction gives more economical results at a temperature of about 350 to 400° C., it may also be effected at a higher temperature not exceeding 600° C.

The pressure may also vary within very wide limits from atmospheric pressure to a pressure of 35 to 40 atmospheres, the spatial velocity of the dichlorethane over the catalyst being increased according to the increase of pressure. The dichlorethane may also be diluted by mixing with inert gases.

*Additional examples*

*Example A.*—Through a tube of stainless steel (1 meter in length and 18 mm. in internal diameter) containing ash-free active carbon heated to a temperature of 400° C., 2.5 kg. of 1,2-dichlorethane vapors are passed in one hour, under a gauge pressure of 6.5 atmospheres. A yield of 99.2% of vinylchloride is obtained with a conversion rate of 67.5% per pass.

*Example B.*—Under the same conditions as in Example A, but under a pressure of 12 atmospheres and with a passing of 2 kg./hr. of 1,2-dichlorethane vapors, a yield of 99% vinylchloride is obtained with a conversion rate of 69% per pass.

*Example C.*—2 kg. of 1,2-dichlorethane vapors are passed in one hour, under a gauge pressure of 8 atmospheres, through a tube of stainless steel of 1 m. in length and 18 mm. in internal diameter, and containing ash-free active carbon heated to a temperature of 500° C. A conversion rate of 77% per pass is obtained, with a yield of 90% of vinylchloride.

These examples show that the conversion rate per pass (the quantity of dichlorethane pyrolysed into vinylchloride) varies from 65 to about 77%. The pyrolysis products obtained contain from 90 to 99.2% of vinyl chloride. The fourth example shows that the best conversion is obtained at elevated temperature (500° C.), but the yield of vinyl chloride is only 90%, the secondary reactions being more important at these elevated temperatures.

What is claimed is:

1. A process for the preparation of vinyl chloride by thermal decomposition of 1,2-dichlorethane in the gaseous phase, which comprises decomposing 1,2-dichlorethane at temperatures of 350–500° C., in the presence of deashed active carbon prepared by washing technical active carbon first with 2 N nitric acid at 50–75° C. and then with water.

2. A process according to claim 1, which comprises decomposing the 1,2-dichlorethane at a temperature between 350 and 400° C.

References Cited in the file of this patent

UNITED STATES PATENTS

| | | |
|---|---|---|
| 1,803,943 | Miller | May 5, 1931 |
| 2,300,600 | Steely et al. | Nov. 3, 1942 |
| 2,779,804 | Braconier et al. | Jan. 29, 1957 |
| 2,912,470 | Kircher et al. | Nov. 10, 1959 |

FOREIGN PATENTS

| | | |
|---|---|---|
| 605,606 | Great Britain | July 27, 1948 |